Oct. 4, 1966

F. W. HALE ETAL 3,276,570

ROD REINFORCED BELT

Filed Jan. 19, 1965

INVENTORS
Frederick W. Hale,
Gerald C. Roinestad

BY Irons, Birch, Swindler & McKie
ATTORNEYS

INVENTORS
FREDERICK W. HALE
GERALD C. ROINESTAD

BY Irons, Birch, Swindler & McKie
ATTORNEYS

United States Patent Office 3,276,570
Patented Oct. 4, 1966

3,276,570
ROD REINFORCED BELT
Frederick W. Hale and Gerald C. Roinestad, Winchester, Va., assignors to Ashworth Bros. Inc., Winchester, Va., a corporation of Massachusetts
Filed Jan. 19, 1965, Ser. No. 429,201
15 Claims. (Cl. 198—193)

This is a continuation-in-part of our copending application Serial No. 335,208 filed January 2, 1964, now abandoned.

This invention relates to conveyor belts and more particularly to rod reinforced wire coil conveyor belts especially suited for use at elevated temperatures.

Wire coil conveyor belts are in common use in various industrial fields including particular high temperature installations. One form of conveyor belt commonly used for this type of work generally comprises a plurality of wire coils disposed in interlocked relation to form hinge connections between the coils. Moreover, cross rods are often inserted through the interlocked portions of the coils to act as reinforcing members.

A major problem with this type of belt has been to prevent the coils of the belt from moving laterally out of their normal pitch so that uniform spacing of the coils is maintained. For example, when such belts are used for high temperature work such as moving material in and out of furnaces and ovens, a rapid expansion and contraction of the material from which the belt is made occurs which tends to distort the coils of the belt out of pitch.

Attempts to solve this problem have resulted in the use of reinforcing cross rods having spaced grooves to receive the interlocked loops of the coils as shown in U.S. Patent 2,447,613 issued August 24, 1948. Other attempts to solve this problem have resulted in individually welding each of the loops of the coils to the reinforcing cross rods. Neither of these methods has proven entirely satisfactory, however, in that they add greatly to the manufacturing costs. Moreover, cutting grooves in the reinforcing cross rods significantly weakens the overall strength of the belt. Other methods of reinforcing such conveyor belts while maintaining uniform spacing of the coils therein have similarly proven unsatisfactory.

To overcome the disadvantages of the prior art it is an object of this invention to provide an improved conveyor belt which possesses considerable strength and yet is economical and simple to construct.

Another object of the invention is to provide such a belt having reinforcing cross rods which maintain proper spacing of the coils in the belt and which are easy to construct.

A further object of the invention is to provide such a belt having a high degree of stability and resistance to distortion.

A still further object of the invention is to provide an improved conveyor belt having reinforcing cross rods extending through the interlocked portions of the wire coils of the belt to prevent the coils from wearing on each other.

Still another object of the invention is to provide such a belt having reinforcing cross rods with helical depressions or valleys formed therein to receive and maintain the loops of the wire coils so that the belt is self centering.

Yet another object of the invention is to provide such a belt which is substantially free of tension on its marginal edges.

The invention generally relates to a conveyor belt comprising a plurality of wire coils extending transversely of said belt, each of said coils having a plurality of axially spaced loops, the loops of adjacent coils being interlocked with each other to form hinged connections, and a plurality of reinforcing cross rods extending through the interlocked portions of said coils at the hinged connections thereof, each of said cross rods having a helical depression along its outer surface providing spaced pivots for said hinged connections.

Preferably each of the cross rods comprises twisted wire means providing the helical depression. Such wire means may be a single flat or otherwise non circular wire twisted about its own axis or a pair of wires twisted longitudinally together. Thus there is formed on the outer surface of each rod a pair of diametrically opposed helical depressions providing spaced pivots for the hinged connections between adjoining wire loops.

The invention having been broadly described, certain specific embodiments will now be set forth in detail with reference to the accompanying drawing in which.

Figure 1:
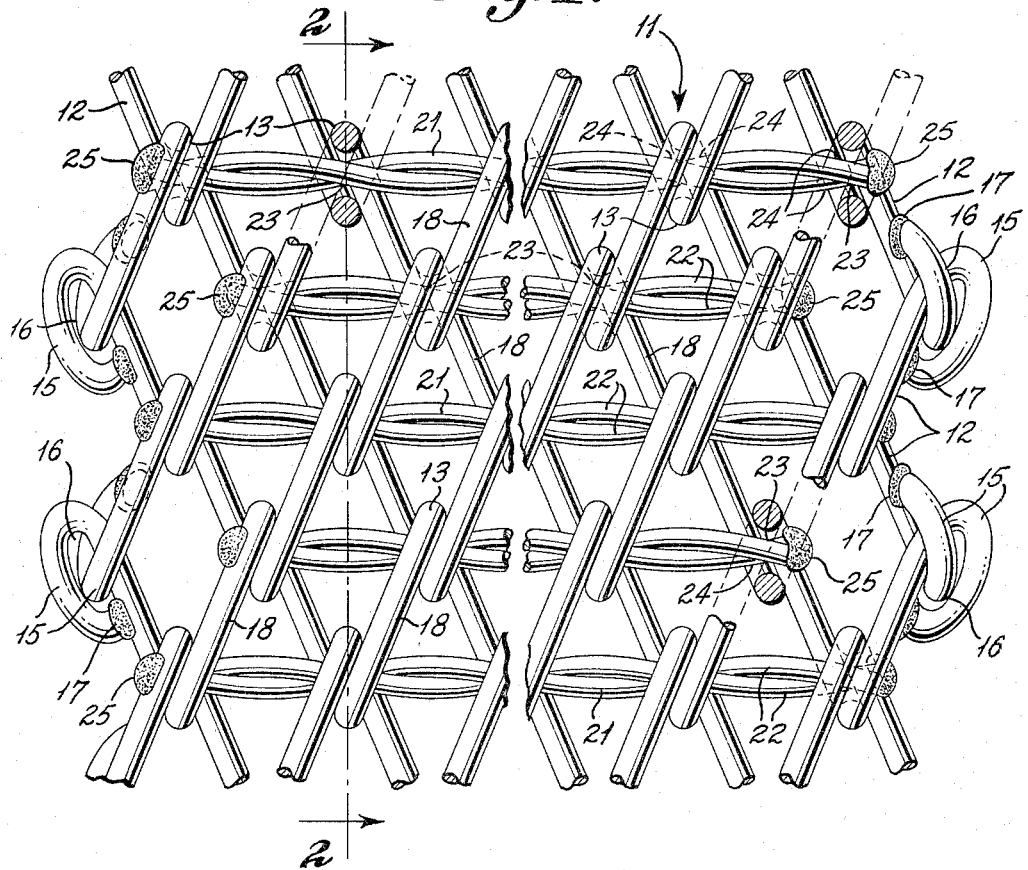
FIGURE 1 is a plan view of a section of a conveyor belt according to the invention.

Illustrated in FIGURE 1 of the drawings is a conveyor belt 11 which comprises a plurality of helical wire coils 12 having a plurality of axially spaced loops 18 disposed in interlocked relation extending transversely of the belt. Hinged connections 13 are thus formed between adjacent coils. Means such as eyelets 15 are provided on the ends of the coils 12 for connecting pairs of adjacent coils together to form a plurality of loosely connected joints 16 on the marginal edges of the belt. The eyelets 15 may be constructed by bending the ends of the coils over and welding them to the main part of the coil as shown at 17. It is to be noted that the eyelets are sufficiently large to permit relative movement between the adjoining coils when the eyelets are connected together to form the joint 16.

A plurality of reinforcing cross rods 21 extend through the interlocked portions of the coils 12. Each of the cross rods is comprised of a plurality of wires 22 twisted together to form a series of spaced valleys or depressions 23 substantially corresponding to the pitch of the wire coils for receiving the loops 18 of the coils. Preferably, each of the cross rods 21 is comprised of an even number of wires twisted together so that the depression are formed on both the front and back of each rod in such a manner as to receive the interlocked loops of the coils. In this regard it is desirable that the depressions 23 on each of the rods be arranged in diametrically opposed positions on the front and back of each of the rods at spaced locations along the length thereof. As shown in FIGURE 1, by having the depressions diametrically opposed at spaced locations along the length of the rods corresponding to the pitch of the wire coils, each pair of interlocked loops of the coils is firmly received by a pair of such diametrically opposed depressions to properly maintain the loops in position. As also shown in FIGURE 1 it is to be noted that the loops of the coils engage the rods in the depressions at the points where the twisted wires comprising the rods are substantially in vertical alignment.

The depressions 23 are formed with inwardly sloping sides 24 to maintain the coils centered therein. This is particularly advantageous when the conveyor belt is used in high temperature work such as that encountered in moving material in and out of furnaces and ovens due to the fact that such work creates a rapid expansion and contraction of the coils which tends to distort them out of pitch. The sloping sides of the depressions tend to cam the coils back into the center of the depression which in effect makes the belt self-centering. Thus it can be seen that the twisted wire reinforcing rods create high stability of the conveyor belt by preventing the shifting of the spiral loops of the coils during operation of the belt.

The twisted wire reinforcing rods having depressions with inwardly sloping sides also possess another important advantage in that they inherently tend to automatically position themselves with respect to the loops of the coils. If the rods should happen to shift slightly out of position, the sloping sides of the depressions will tend to cause the rods to move back to their normal positions. Moreover, when the rods are initially inserted between the interlocked loops of the coils, they tend to position themselves properly due to the depressions. This of course makes the construction of the belt much easier and results in an economical saving of time.

Twisting together a plurality of wires provides a simple and economical method of constructing the reinforcing cross rods which represents a significant improvement over the prior art in that the twisting automatically creates a series of spaced valleys or depressions lengthwise of the rods. This eliminates the necessity of forming the depressions by a separate metal removing operation. The spacing of the depressions may be varied merely by changing the degree of twist of the wires comprising the rods. Moreover, reinforcing rods constructed in this manner inherently possess a high degree of strength due to the fact that it is not necessary to remove or cut out a portion of the rods to form the depressions. The twisted wire reinforcing rods thus have substantially the same cross sectional area throughout the entire length of the rods while still having spaced depressions to receive the loops of the wire coils comprising the belt.

As shown in FIGURE 1 of the drawings, each of the connecting rods 21 is attached at its ends 24, as by welding, to one of the coils 12. If desired, however, the twisted wire reinforcing rods may be connected at only one end rather than at both ends.

By attaching a reinforcing rod 21 to each of the coils 12 a series of constructional triangles are formed which significantly increase the rigidity and strength of the belt. Moreover, it is to be noted that the cross rods 21 extending through the interlocked portions of the coils 12 absorb substantially all of the stress between the coils created by movement of the belt. In this manner none of the tensional or other stress of the belt is transmitted to the joints 16 formed on the marginal edges of the belt, thus resulting in tensionless or non stressed edges. Consequently, there is substantially no tendency for the belt to be weakened by failure of the joints 16. The reinforcing rods 21 also act as pins for each of the hinged connections 13 formed by the interlocked coils and substantially prevent the coils from wearing on each other.

Figure 2:
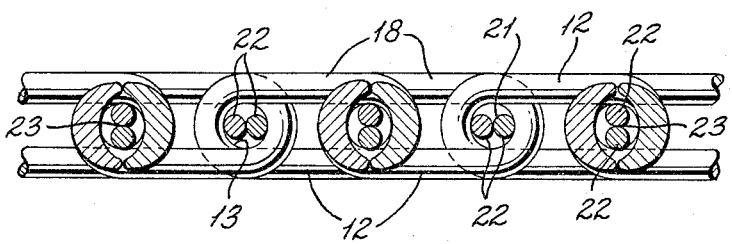
FIGURE 2 is a cross section view taken along the line 2—2 of FIGURE 1.
Figure 4:
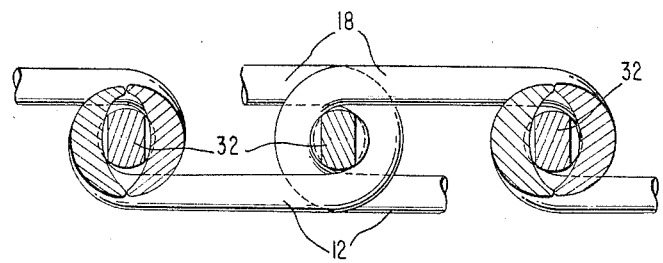
FIGURE 4 is a cross sectional view taken along the line 4—4 FIGURE 3.

As best shown in FIGURES 2 and 4 of the drawings, the loops of the coils 12 are flattened on their top and bottom surfaces to increase the resistance of the belt to stretching during operation thereof. The flattened wire coil constuction not only adds to the strength of the belt but also permits a relatively thin construction which gives less weight per square foot as well as equal cross section of the belt.

In the embodiment of the belt just described a plurality of interlocked sections are actually formed extending transversely of the belt. As can be seen from FIGURE 1 of the drawings, each of these sections comprises a pair of adjacent interlocked wire coils 12 connected together at their ends by eyelets 15, or other suitable means. A pair of parallel reinforcing cross rods 21 extend through the coils of each section. One of the cross rods is disposed through the interlocked portions of the two adjacent coils in the center of the section and is attached to one of the coils while the other of the cross rods extends through the outer portions of the loops of the other coil and is attached thereto for connection with one of the coils of the adjacent section of the belt.

As previously stated, this particular type of belt construction is particularly adapted for use in high temperature work such as moving material in and out of furnaces or ovens. For example, the belt has been found to be especially suitable for use in the temperature range of 1400° F. to 2300° F. The belt may be used within a variety of other temperature ranges, however, and is not to be restricted to use only within the above mentioned temperature ranges.

A belt construction according to the principles of the present invention makes it possible to realize the inherent strength of the spiral loops of the coils in tension. Moreover, the belt is not limited by belt failure or edge shift in that loosely connected joints are provided on the marginal edges of the belt which are substantially free of tension or other stress. Also the fact that the interlocked loops of the wire coils are preseated in the depressions of the twisted wire connecting rods eliminates a break-in period and results in a belt which is more easily tracked and controlled.

Where the cross rods are formed of a pair of twisted wires as illustrated in FIGURES 1 and 2, the wires should have a twist of the opposite hand from the twist of the loops 18. With such an opposite twist the force exerted by the loops on the cross rods when the belt is under tension tends to tighten the twist. On the other hand, if the rods and the loops have the same hand such tension will tend to untwist the rods. At the same time, there is a better seating between the loops and the rods at the pivot points if the twist of the rods is the same hand as that of the loops. Thus, if it were not for the tendency for the wires to become untwisted, it would be preferable to utilize the same hand twist between the rods and the wire coils.

That desirable end can be achieved by utilizing a single flat wire twisted about its own axis rather than a pair of wires twisted longitudinally together. Such a single twisted wire is employed in the modified belt 31 illustrated in FIGURES 3 and 4. The belt 31 is identical to the belt 11 shown in FIGURE 1 except for the differences in the reinforcing cross rods and as otherwise stated.

In the belt 31 each of the cross rods 32 is comprised of a single wire having a non circular cross section. Preferably the cross section of each rod is generally flat as shown in FIGURE 4. The single wire is twisted about its own axis to form a pair of diametrically opposite helical depressions 33 and 34 extending around the outer surface of the rod from one end to the other. The top and bottom edges of the flat wire are preferably arcuate with the center of the wire defining the center of the arcs. Thus the external cross section of the twisted wire is circular with the helical depressions extending into the circle. The pitch of the helical depressions 33 and 34 is uniform throughout the length of the rod and substantially corresponds to the pitch of the loops 18 of the wire coils 12. The function and advantages of the helical depressions 33 and 34 are the same as previously set forth with respect to the rods formed by two twisted wires.

It will be observed, however, that the rods 32 have a twist which is of the same hand as that of the coils 12. This enables better seating of the ends of the loops 18 in the depressions 33. The latter thus function more effectively as pivots and retain the loops in the depressions to a greater degree. Naturally since only a single rod is involved, there is no tendency to cause untwisting due to tension on the belt.

Figure 3:
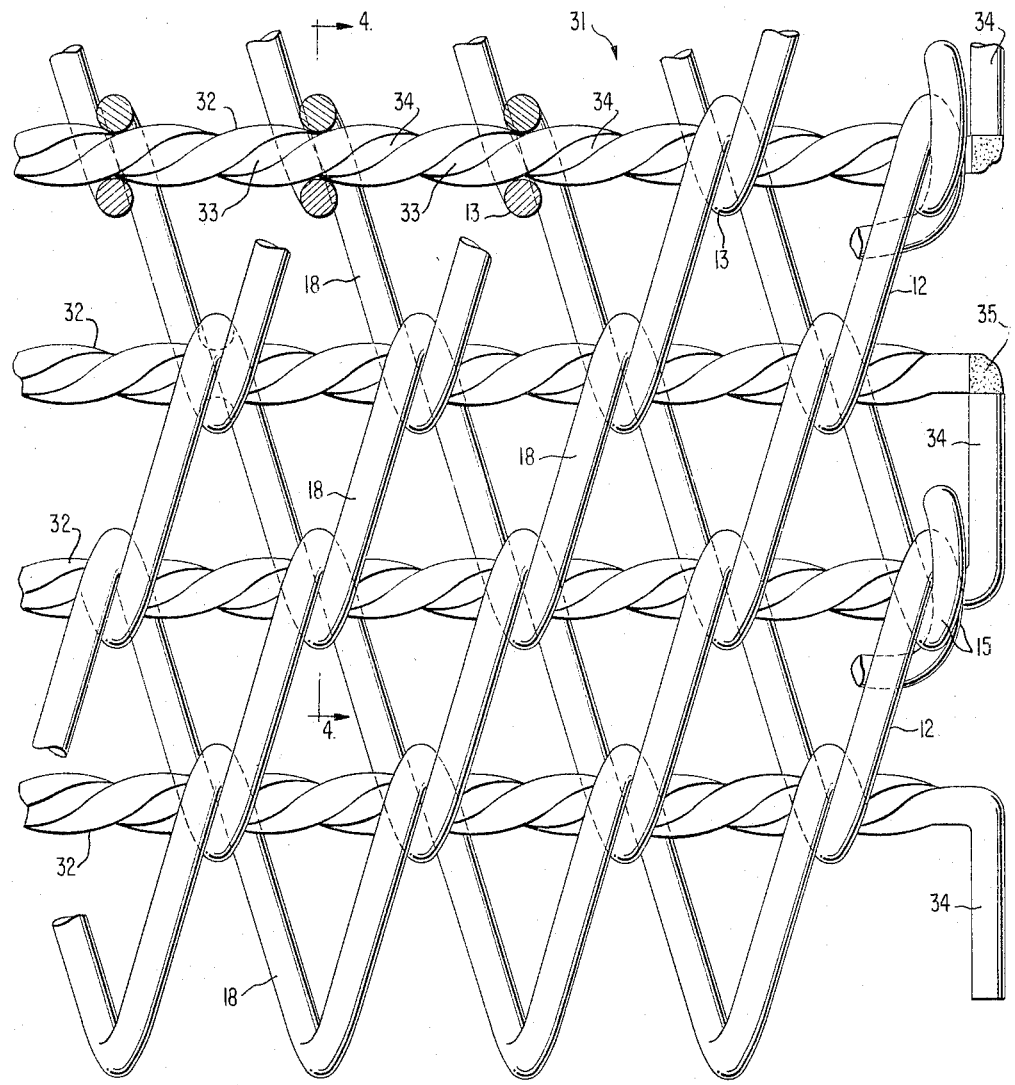
FIGURE 3 is a plan view of a section of a modified conveyor belt according to the invention.

As shown in FIGURE 3 it is the preferred construction to bend over the ends of half of the rods 32 as shown at 34 and join such bent over ends to adjoining rods by weld 35. Alternatively, the ends of the rods 32 may be welded to the coils as shown in FIGURE 1.

The coils 12 in FIGURE 3 are identical to those of FIGURE 1 except that the former do not have welded ends.

Whether multiple wires or a single non circular wire are employed, the twisted rods may be easily and economically fabricated. For example, one end of the rod may be held in fixed position while the other is grasped by a rotatable chuck. Then the rod is twisted about its own axis by rotation of the chuck to form the helical depression having a uniform pitch from end to end of the rod.

While the invention has been described with particular reference to specific preferred embodiments, many other modifications may be made by persons skilled in the art without departing from the scope of the invention which is defined solely by the appended claims.

What is claimed is:

1. A conveyor belt comprising a plurality of wire coils extending transversely of said belt, each of said coils having a plurality of axially spaced loops, the loops of adjacent coils being interlocked with each other to form hinged connections, and a plurality of reinforcing cross rods extending through the interlocked portions of said coils at the hinged connections thereof, each of said cross rods having a pair of helical depressions extending continuously around and along its outer surface providing spaced pivots for said hinged connections.

2. A conveyor belt comprising a plurality of wire coils extending transversely of said belt, each of said coils having a plurality of axially spaced loops, the loops of adjacent coils being interlocked with each other to form hinged connections, and a plurality of reinforcing cross rods extending through the interlocked portions of said coils at the hinged connections thereof, each of said cross rods having on its outer surface a pair of diametrically opposed helical depressions providing spaced pivots for said hinged connections.

3. A conveyor belt comprising a plurality of wire coils extending transversely of said belt, each of said coils having a plurality of axially spaced loops, the loops of adjacent coils being interlocked with each other to form hinged connections, and a plurality of reinforcing cross rods extending through the interlocked portions of said coils at the hinged connections thereof, each of said cross rods comprising twisted wire means defining a pair of diametrically opposed helical depressions providing spaced pivots for said hinged connections.

4. A conveyor belt comprising a plurality of wire coils extending transversely of said belt, each of said coils having a plurality of axially spaced loops, the loops of adjacent coils being interlocked with each other to form hinged connections, and a plurality of reinforcing cross rods extending through the interlocked portions of said coils at the hinged connections thereof, each of said cross rods being comprised of a plurality of wires twisted longitudinally together to form a series of spaced depressions providing spaced pivots for said hinged connections.

5. A conveyor belt as defined in claim 4 wherein said depressions on each of said rods are arranged in diametrically opposed positions on the front and back of each of said rods at spaced locations along the length thereof coincident with said spaced loops.

6. A conveyor belt as defined in claim 4 wherein each of said rods is comprised of an even number of said wires.

7. A conveyor belt comprising a plurality of wire coils extending transversely of said belt, each of said coils having a plurality of axially spaced loops, the loops of adjacent coils being interlocked with each other to form hinged connections, and a plurality of reinforcing cross rods extending through the interlocked portions of said coils at the hinged connections thereof, each of said cross rods being comprised of a wire having a non circular cross section twisted about its own axis thereby defining a pair of diametrically opposed helical depressions providing spaced pivots for said hinged connections.

8. A conveyor belt as defined in claim 7 wherein said wire has a generally flat cross section.

9. A conveyor belt as defined in claim 8 wherein the top and bottom of said flat wire are arcuate with the center of the wire forming the center of the arcs.

10. A conveyor belt comprising a plurality of interlocked wire coils having a plurality of axially spaced loops extending transversely of said belt, means on the ends of said coils for connecting pairs of adjacent coils together to form a plurality of loosely connected joints on the marginal edges of said belt, and a plurality of reinforcing cross rods extending through the interlocked portions of said coils, each of said cross rods being comprised of twisted wire means having a helical depression along its outer surface providing spaced pivots for said hinged connections.

11. A conveyor belt as defined in claim 10 wherein said means comprises eyelets formed on the ends of said coils.

12. A conveyor belt comprising a plurality of interlocked sections extending transversely of said belt, each of said sections comprising a pair of interlocked wire coils, each of said coils having a plurality of axially spaced loops, eyelets formed on the ends of said coils with the eyelets of one coil being connected to the eyelets of the other coil to form a loosely connected joint on each marginal edge of said belt, and a pair of parallel reinforcing cross rods extending through said coils, one of said cross rods being disposed through the interlocked portions of said coils, each of said cross rods being comprised of twisted wire means having a helical depression along its outer surface providing spaced pivots for said hinged connections.

13. A conveyor belt according to claim 7 wherein said coils are characterized by a twist of the same hand as the twist of said wires.

14. A conveyor belt according to claim 8 wherein said coils are characterized by a twist of the same hand as the twist of said wires.

15. A conveyor belt according to claim 9 wherein said coils are characterized by a twist of the same hand as the twist of said wires.

References Cited by the Examiner
UNITED STATES PATENTS 2,114,181 4/1938 Guba _____ 198—194
2,255,364 9/1941 Pink _____ 198—193

EVON C. BLUNK, Primary Examiner.

RICHARD E. AEGERTER, Examiner.